Patented Jan. 19, 1926.

1,569,861

UNITED STATES PATENT OFFICE.

JOHN LEONARD KELLOGG, OF BATTLE CREEK, MICHIGAN, ASSIGNOR, BY MESNE ASSIGNMENTS, TO KELLOGG COMPANY, OF BATTLE CREEK, MICHIGAN, A CORPORATION OF DELAWARE.

PROCESS OF PREPARING CEREAL FOOD.

No Drawing.     Application filed November 28, 1922. Serial No. 603,863.

*To all whom it may concern:*

Be it known that I, JOHN LEONARD KELLOGG, a citizen of the United States, residing at Battle Creek, in the county of Calhoun and State of Michigan, have invented certain new and useful Improvements in Processes of Preparing Cereal Food, of which the following is a full, clear, and exact description, such as will enable others skilled in the art to which it appertains to make and use the same.

This invention relates to a process for preparing cereal foods from bran or similar cereal substances, and to the product which may assume the form of loose flakes, shreds, biscuit cakes or similar shapes.

One of the objects of the invention is to provide an improved process of preparing a food from bran or similar material by which there is produced a food which is palatable, and which has a consistency and form which makes it convenient to serve and easily digested.

Another object of the invention is to provide an improved method for reducing the bran or similar material to a porous, sweet and toothsome product which, when coming in contact with water or milk, readily absorbs the same, immediately producing a palatable food without the ordinary characteristics of flaked cereals.

Another object of the invention is to produce a particularly attractive form of cereal which may be used in the form of bread and which is adapted for use in combination with other food substances like bread or which may be used as breakfast cereal when combined with milk or cream.

Another object of the invention is to provide an improved process for preparing a food having the general characteristics as outlined above and in addition having a laxative or other medical qualities.

Another object of the invention is to provide an improved form of bran food which readily absorbs water or milk.

Other objects of the invention will be in part obvious and in part pointed out hereinafter.

The invention accordingly comprises the several steps and the relation and order of one or more of such steps with respect to each of the others, and the product resulting therefrom possessing the features, properties, and the relation of components, which are exemplified in the following detailed disclosures, and the scope of the application of which will appear in the claims.

In the practice of this invention in its preferred form, there is first selected carefully cleaned bran free from foreign materials. Such bran may contain from five to twenty or more percent of carbohydrate in the form of flour or if desired flour or starch may be added as such to the bran. While bran free from flour, and without flour added, may be used, it is preferred to use a bran from which the carbohydrate materials have not been completely separated.

This bran is then placed in a cooker preferably of the rotary type which is adapted to treat the bran under steam pressure for the purpose of increasing the temperature beyond 212° F., and at the same time the cooker is rotated or agitated to insure thorough cooking of the bran particles. Preferably also at this stage, a suitable flavoring is added to the bran, the preferred flavoring being a combination of malt, sugar and salt in suitable proportions. This flavoring may be blown into the rotary cooker with the steam under pressure while the cooker is in motion, thereby impregnating the flavor into every particle of the bran. The flavoring, however, may be mixed into the bran in an ordinary mixer before placing in the cooker or it may be mixed by hand with the bran. As an alternative for the rotary cooker, the bran may be placed in individual pans or in any other form of steam cooker for producing a similar result. The cooking process is continued from ten to thirty minutes at a steam pressure of fifteen pounds more or less depending upon the duration of time of cooking. The bran is found to be well cooked in thirty minutes at fifteen pounds steam pressure.

Having been thoroughly cooked, the bran may now be shredded immediately if desired. It is found preferable, however, to dry the bran partially with an ordinary hot air drier or in a baker's oven. Good results may be obtained by shredding the bran immediately after partially drying as above described but it is found to be preferable to further reduce the fineness of the bran immediately after it leaves the cooker and before drying. This reduction may be produced by grinding the bran in an attrition mill to the consistency of a fine powder. If the bran is ground after drying instead of before, as above described, it is found that more power is required as the resulting powder is coarser than when ground in a wet state. If desired, the bran might be ground into a powder before cooking and after cooking then shredded.

As a substitute for the grinding above described, the bran may be shredded on completion of cooking and then re-shredded to reduce the size of the bran flakes properly, or, in addition to shredding a number of times, the bran may be ground.

In any case, the bran, as above prepared, is then either flaked or shredded to give the bran particles their final form. After flaking, the particles may be packed as individual flakes or they may be molded and pressed into biscuit form while in a wet condition and then toasted, thus producing a bran biscuit similar in character to a shredded bran biscuit.

If the cooked, ground and dried bran is shredded, either wide or fine shreds may be produced by the rolling which the bran undergoes in this step of the process. It is found, however, that finer shreds reduce the bran itself to a finer texture than the wider shreds which are likely to contain coarser particles of bran. The ordinary preferred fine shreds are approximately twenty thousandths of an inch deep and of approximately the same width, and in producing such shreds, the bran is cut thoroughly to produce a very fine grained shred in which the material is ground to very fine particles, making the food very easily soluble in milk or water.

A method of reducing the thickness of the shreds still further, consists in increasing the pressure on the shredded rolls. If a thin shred is desired, the pressure is increased to a point at which the shred may be taken from each grooved roll. If a coarse thick shred is desired, the pressure is released and shreds form on one roll only. In the case of the thinner shreds formed under the higher pressure, the material splits longitudinally as it passes through the rolls and half of the shred adheres to the face of one roll and the other half to the other roll. If it is desired in either instance to add more flavoring to the shredded cereal than has been possible to cook therein while in the cooker, such flavoring may be sprayed over the shreds as they leave the shredder.

After the shreds have been produced in the manner above described they may be toasted to produce a bran food which readily absorbs milk or water in its ribbon shreds or when broken into granular form. If desired, the shreds before toasting may be molded into a biscuit. Finely shredded material produces a most palatable biscuit, as the fineness of shreds enables the heat to thoroughly dextrinize the carbohydrates of the bran thereby producing a light, porous and toothsome article which, when coming in contact with water or milk, at once absorbs the same and produces a very palatable food without the ordinary characteristics of flaked bran. This biscuit is particularly attractive when used with butter, like bread, or toasted and may be served like toast for poached eggs and similar purposes, and may be used with milk or cream like milk toast or a cereal.

If desired, the shreds, instead of being left in their ribbon-like form, may be cut off into short lengths and then flaked which process produces a very attractive form of flakes. Such flakes may be further treated in a manner similar to the flakes above described.

It is noted that, although finely ground, the bran does not lose its characteristic medicinal properties. If desired, such substances as fruits, cascara-sagrada, extracts of senna leaves or other substances having desirable medicinal qualities or flavoring properties may be mixed with the bran at any stage of the above described process in order to produce a laxative food.

Since many changes could be made in carrying out the above process and many widely different constructions embodying the principles of the steps set forth without departing from the scope of the invention, it is intended that all matter contained in the above description shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention what I claim as new and desire to secure by Letters Patent, is:

1. The process of preparing a cereal food which comprises cooking bran under pressure in a closed receptacle, and adding flavoring material thereto during such cooking.

2. The process of preparing a cereal food which comprises cooking under steam pressure in a closed receptacle, and introducing flavoring material into the receptacle with the steam.

In testimony whereof I affix my signature.

JOHN LEONARD KELLOGG.